April 28, 1953  B. E. O'CONNOR  2,636,399
TUNED INERTIA MASS VISCOUS DAMPER
Filed June 17, 1950  2 SHEETS—SHEET 2

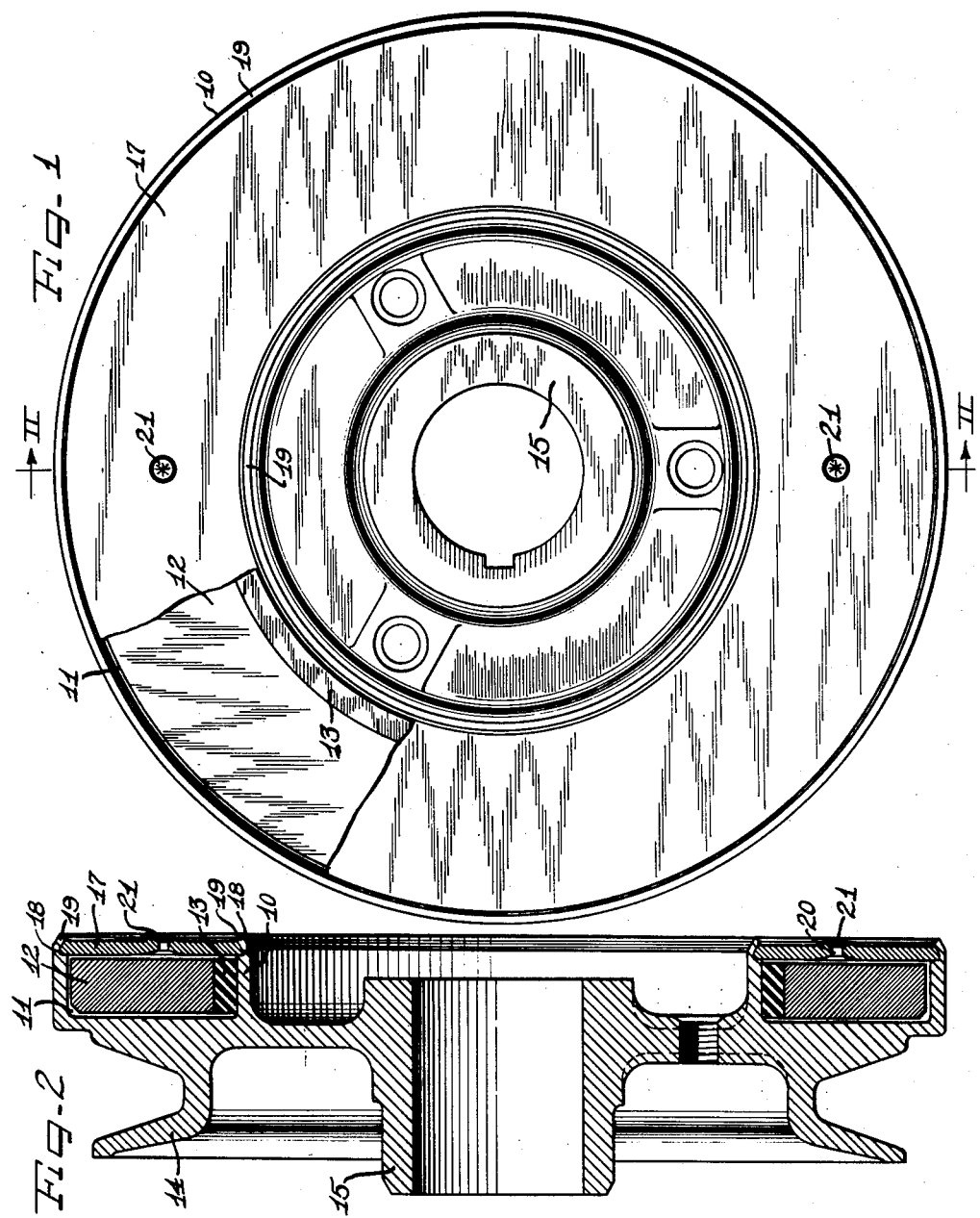

Inventor
Bernard E. O'Connor
by The Firm of Charles A. Will
Attys

Patented Apr. 28, 1953

2,636,399

UNITED STATES PATENT OFFICE 2,636,399

TUNED INERTIA MASS VISCOUS DAMPER

Bernard E. O'Connor, Buffalo, N. Y., assignor to Houdaille-Hershey Corporation, Detroit, Mich., a corporation of Michigan Application June 17, 1950, Serial No. 168,738

9 Claims. (Cl. 74—574)

The present invention relates to improvements in vibration dampers and is more especially directed to overcoming the problem of torsional oscillations or vibrations in rotary masses such as crankshafts or the like whereby to reduce or eliminate wear and noise in associated apparatus and to avoid fatigue failure in the mass to be damped.

An important object of the present invention is to provide an improved viscous fluid damper operating on the principle of an inertia mass coupled in vibration damping relation by viscous fluid with a housing adapted to be fixed to a vibratory mass to be damped, and wherein the inertia mass has a tuned spring connection with the housing.

Another object of the invention is to provide improvements in tuned inertia mass viscous vibration dampers.

A further object of the invention is to provide vibration damping means which are highly adaptable to meet various operational requirements.

Other objects, features and advantages of the present invention will be readily apparent from the following detailed description taken in conjunction with the accompanying drawings, in which:

Figure 1 is a face elevational view, partially broken away for illustrative purposes, showing a tuned inertia mass vibration damper embodying features of the invention.

Figure 2 is a diametrical sectional view taken substantially on the line II—II of Figure 1.

Figure 3:
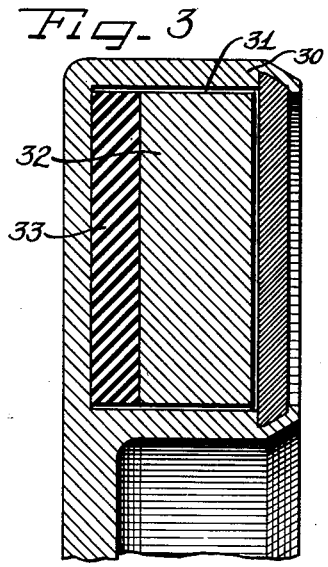
Figures 3, 4, 5 and 6 are fragmentary radial sectional views through respective modifications of tuned inertia mass vibration dampers of the type exemplified in the form of Figures 1 and 2.

Although several forms of vibration dampers according to the present invention have been shown, and will hereinafter be described in detail, all forms have certain characteristics in common. That is, they are all of the viscous fluid damper type, and they all embody a tuned inertia mass wherein the tuned relationship is attained by the use of a rubber or rubber-like spring by which the inertia mass is coupled to an enclosing housing.

In these dampers, the principal vibration damping or vibrational energy absorption is effected by the use of a viscous fluid such as a silicone to effect a yieldable, relative movement resistant coupling between a damping inertia mass and a housing arranged to be secured rigidly to a mass to be damped, such as a driven rotary or torsionally movable object such as a crankshaft subject to torsional oscillations or vibrations. More specifically, an inertia mass or flywheel is so disposed in spaced, relatively parallel movable relation to internal surfaces within the housing, that when the housing moves with the mass to be damped, thin films of the viscous fluid intervening between the opposing parallel working surfaces of the flywheel or inertia mass and the adjacent surfaces within the housing provide a fluid coupling between the working surfaces due to the inherent shear resistance of the viscous fluid. That is, the viscous fluid is present between the opposing parallel working surfaces of the inertia mass and the housing in films which are thicker than a mere lubricating film but which are of less thickness than a layer which will provide for merely a fluid drag relationship. Stated another way, the shear films of viscous fluid are the result of an essentially linear velocity gradient spacing between the opposing parallel working surfaces of the members with relation to the viscosity of the damping fluid rather than a non-linear velocity gradient relationship. As the main mass to be damped tends to vibrate in operation or as the result of some vibration inducing force in its environment, the viscous fluid shear films resist independent movement or inertia isolation of the inertia mass relative to the housing to which the vibrations of the mass are transmitted and the vibrational energy is thus absorbed by the viscous fluid. The force necessary to shear the viscous films between the working surfaces of the inertia mass and the housing is proportional to the relative angular velocity between the working surfaces during the vibration. The optimum proportion of the resistance of the viscous films to the moment of inertia of the inertia mass is easily calculated for any specific installation.

For some purposes an objectionable natural frequency vibration will occur at some phase of operation in the mass to be damped and to overcome this the inertia mass is connected to the housing by means of a rubber or rubber-like tuning spring which imposes a counter-acting force by action of the inertia mass through the spring upon the natural frequency vibrations of the main mass, thereby dissipating such vibrations. Since a tuned damper must be especially designed for each particular application having known natural frequency vibration to be overcome, provision must be made for ready adaptability and versatility in construction to meet a wide range of operating requirements.

In one form of the tuned inertia mass damper according to the present invention, and as shown in Figures 1 and 2, a casing or housing 10 has therein a chamber 11 housing an inertia mass 12 which is operatively attached to the housing by means of a rubber or rubber-like tuning spring 13. For brevity in referring to the spring 13, and the springs of the modified forms of the damper, the term "rubber" will be used and it should be understood that by this term is meant either natural rubber or any synthetic rubber or plastic material having the characteristics of resilience and elasticity inherent in resilient natural rubber.

The housing 10 may comprise part of a fan belt pulley structure for use on the crankshaft of an automotive engine (not shown) for vibration absorbing purposes. For this purpose the housing 10 has at one side an annular radially outwardly opening channel-shaped flange 14 defining a pulley groove. A central tubular hub 15 is provided for attaching the pulley-damper unit to the crankshaft.

Since the inertia mass 12 in order to be effective for damping the torsional oscillations or vibrations of the crankshaft with which the unit may be associated must be in the form of a rotary mass or flywheel, the chamber 11 provided by the housing for the inertia mass is herein preferably in the form of a generally axially opening annular channel, and the inertia mass 12 is in the form of a ring or wheel which is assembled into the housing through the open side thereof. Thereafter, the housing is closed by an annular closure disk or plate or cover 17. The margins of the cover are received on respective rabbet groove shoulders 18 and the margins of the housing defining the mouth of the chamber 11 are turned over onto the margins of the cover plate as shown at 19 to secure the cover plate permanently and in fluid-tight relation to the housing.

A tuned relationship of the inertia mass 12 to the housing 10 requiring a spring of only relatively small proportions, that is, a small size spring, is afforded by the rubber spring 13 which is secured between the inner periphery of the inertia mass ring 12 and the inner periphery of the walls defining the chamber 11 within the housing. For various tuning requirements, of course, both the radial and axial dimensions of the rubber spring 13 with relation to the housing and inertia mass can be varied, or either of these dimensions can be varied in calculated respects. In any event, the rubber spring is in fixed attachment to both the housing and the inertia mass. This can be effected by bonding or other surface adhesion. It will be observed that the axial sides of the spring 13 as well as the axially facing sides and the outer periphery of the inertia mass 12 are in spaced relation to all of the opposing surfaces within the chamber 11. As a result, torsional movements of the housing 10 will, through the rubber spring coupling 13 cause the inertia mass 12 to move with the housing. However, the inertia mass will tend to continue its momentum despite torsional movements of vibrational nature out of phase with the normal momentum of the housing 10, and the resilience of the rubber spring 13 will normally enable the inertia mass to resist disturbance in its momentum by such vibrations.

When the vibrations in the housing 10 as transmitted thereto by the mass to be damped with which the housing is operatively connected, reach a natural frequency for which the damper is tuned through the spring 13, counteracting vibration is induced in the flywheel or inertia mass 12 and the counteracting force thus generated operates through the spring 13 upon the housing 10 to dampen or dissipate the natural frequency vibration.

Ordinary torsional vibrations transmitted from the mass to be damped to the housing 10 are damped by shear films of viscous fluid between the opposing working surfaces of the inertia mass 12 and the surfaces defining the inside of the chamber 11. For this purpose, the axially facing and outer peripheral surfaces in opposing relation of the inertia mass and the chamber are predetermined to accommodate but shear films of a viscous fluid in the spacing or clearance therebetween. A viscous fluid for this purpose may be a selected silicone. Such a viscous fluid has the attributes of proper viscosity rating for the purpose desired, substantially uniform viscosity throughout a wide temperature range, and it is readily available commercially. The viscous fluid is filled into the chamber 11 through means such as openings 20 in the cover plate 17 which are suitably sealed as by welding 21 after the fill has been accomplished. By resistance to relative parallel movement of the working surfaces of the inertia mass 12 and the chamber 11, the viscous fluid coupling dampens the torsional vibrations.

Where the tuning requirements are greater than can be accommodated by an inner peripheral rubber spring 13 as shown in Figs. 1 and 2, for any particular installation, the modifications shown in Figure 3 may be utilized. In this form, a casing or housing 30 provides a chamber 31 for an inertia mass 32 having a rubber spring coupling 33 with the housing. In this instance, the rubber spring 33 is secured between an axially facing surface of the inertia mass 32 and the opposing axially oppositely facing surface within the chamber 31 with the peripheral edges of the spring 33 and of the inertia mass 32 as well as the opposite axially facing surface of the inertia mass being in spaced relation to the opposing surfaces defining the housing chamber 31. Through this arrangement, a rubber tuning spring of substantially greater mass is attained. The inner and outer peripheral as well as the free axially facing surfaces of the inertia mass are in shear film spaced relation to the opposing surfaces within the casing and the spaces are filled with viscous fluid so that viscous damping of vibrations at amplitudes other than a natural frequency amplitude vibration is accomplished. The natural frequency vibration is counteracted by action of the inertia mass through the rubber spring coupling 33.

Figure 4:
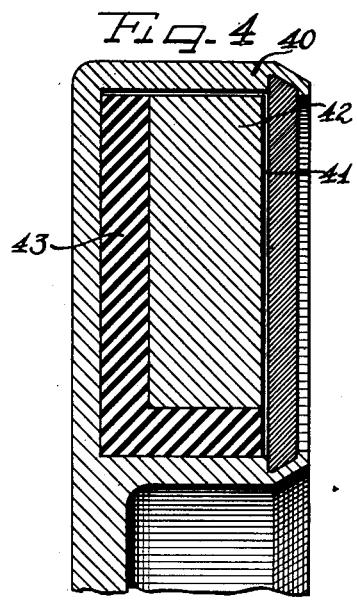

In Figure 4 is shown a vibration damper construction wherein the rubber spring coupling is substantially increased over that of the form of Figure 3. To this end, a casing 40 having an inertia mass chamber 41 houses an inertia mass or flywheel ring 42 which is connected to the housing by means of a rubber spring 43. In this form the rubber spring connects not only the inner peripheral surface of the flywheel or inertia mass 42 but also one of the axially facing surfaces of the inertia mass. This affords a rubber spring of quite large mass. The remaining axially facing surface and outer peripheral surface of the inertia mass 42 cooperate in spaced opposition to the opposing surfaces within the housing 40 to afford shear film spacing therewith filled with a viscous damping fluid so that a combination of viscous damping and tuned damping is attained.

Figure 5:
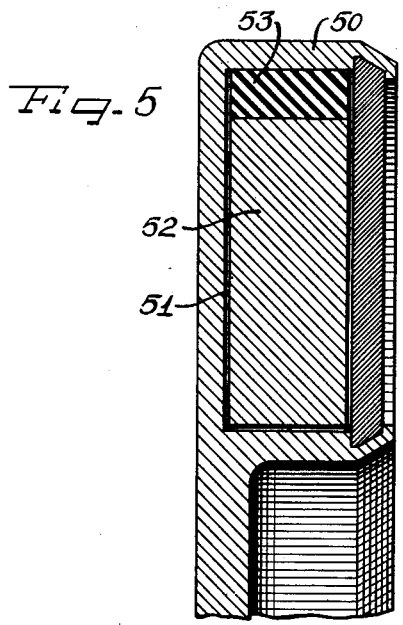

For some purposes the form of Figure 5 will be more adequate by providing a rubber spring of a mass different from that attained by the forms of damper described hereinabove. To this end, a casing or housing 50 has therein a chamber 51 housing an inertia mass or flywheel ring 52 which is attached to the housing through the medium of a rubber spring 53 connecting the outer periphery of the flywheel ring to the outer periphery defining the chamber 51. The axially facing edges of the rubber spring 53 are in spaced relation to the opposing surfaces of the housing. Both of the opposite axially facing surfaces of the inertia ring 52 and the inner peripheral edge of the inertia ring are in shear film spaced relation to the opposing surfaces of the housing and the chamber is filled with viscous fluid providing shear films between the opposing working surfaces.

Figure 6:
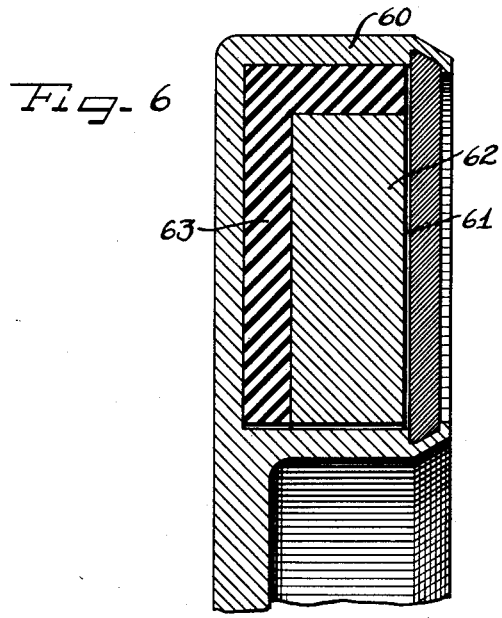

In the form of Figure 6, a relationship of rubber spring to inertia mass and housing is provided for wherein the rubber spring is of large mass compared to the inertia ring. To this end, a housing 60 has an inertia mass chamber 61 housing an inertia mass 62 which is coupled to the housing by a rubber spring 63 at one axially facing side and at its outer periphery. The inner peripheral and the exposed axially directed edge surfaces of the rubber spring are in spaced relation to the opposing surfaces of the housing, and the inner peripheral surface and the free axially facing surface of the inertia mass are in shear film spaced relation to the opposing surfaces of the housing, with viscous damping fluid providing shear film couplings therebetween.

In all forms of the invention, the rubber coupling springs afford an economical, efficient spring coupling which is especially suitable for use where premium on available space is a factor in design for any particular application. The rubber springs afford high spring efficiency in low unit mass by reason of the relative density of the rubber and the high degree of resiliency per unit mass of the rubber springs. Internal frictional heat that may develop in the rubber springs is distributed and dissipated by the viscous fluid to parts of the housing remote from the spring-attached portions of the housing, and thereby overheating or at least undesirable heating of the rubber springs is avoided. In each instance it will be observed that the rubber springs maintain the respective associated inertia masses in substantially proper shear film spaced relation to the opposing surfaces within the housing.

It will be understood that modifications and variations may be effected without departing from the scope of the novel concepts of the present invention.

I claim as my invention:

1. In combination in a vibration damper, a housing structure providing a fluid-tight chamber, an inertia mass structure housed within said chamber and relatively movable therein, a viscous damping fluid within the housing, said housing structure and said inertia mass structure having opposed parallel working surfaces which are in essentially linear velocity gradient spacing relative to the viscosity of the damping fluid and have a shear film of the fluid therebetween, such shear film being thicker than a mere lubricating film but being of less thickness than a layer of the fluid which would afford only a non-linear velocity gradient relationship, said shear film of the fluid acting between said working surfaces to resist relative parallel movement thereof, and a rubber tuning spring connecting a surface of the inertia mass structure to the housing within said chamber.

2. A vibration damper according to claim 1 wherein the housing and the inertia mass structure are annular in form and said rubber tuning spring is also annular in form.

3. A vibration damper according to claim 2 wherein the annular rubber tuning spring is interposed between the inner peripheral surface of the inertia mass structure and the opposing surface of the chamber.

4. A vibration damper according to claim 2 wherein the rubber tuning spring is interposed between an axially facing surface of inertia mass and the opposing axially facing surface of the chamber.

5. A vibration damper according to claim 2 wherein the annular rubber tuning spring is interposed between the outer peripheral surface of the annular inertia mass structure and the opposing surface of the chamber.

6. A vibration damper according to claim 2 wherein the rubber tuning spring is interposed between the inner peripheral surface and also an axially facing surface of the inertia mass and the opposing surfaces of the chamber.

7. A vibration damper according to claim 2 wherein the rubber tuning spring is interposed between the outer peripheral surface of the annular inertia mass and an axially facing surface of the inertia mass and the opposing surfaces of the chamber.

8. In combination in a vibration damper, a housing having a closed chamber, said chamber having a plurality of angularly related surfaces, an inertia mass housed within said chamber and having surfaces opposing the chamber surfaces, a rubber tuning spring in secure engagement with one of the surfaces of the inertia mass and the opposing surface of the chamber and supporting said inertia mass in fully spaced relation within the chamber, said tuning spring being spaced from all surfaces within the chamber except the surface against which it is secured, and a viscous damping fluid within said chamber interposed between the surfaces of the inertia mass and the chamber except where the tuning spring engages between opposing surfaces of the inertia mass and the chamber.

9. In combination in a rotary vibration damper for damping torsional vibrations in a crankshaft or the like, a housing having a hub adapted to be attached to the crankshaft for rotation of the housing with the crankshaft, said housing having an annular chamber having an annular opening thereinto, a closure plate sealingly closing said opening and providing with the other surfaces in the chamber a plurality of angularly related opposite radially facing and oppositely axially facing surfaces, an annular inertia mass in said chamber and spaced from all of the surfaces in the chamber, an annular rubber tuning spring secured between certain opposing surfaces of the inertia mass and the housing and supporting the inertia mass in said spaced relation, and a viscous damping fluid interposed between all of the free spaced opposing surfaces of the inertia mass and the housing within the chamber.

BERNARD E. O'CONNOR.

References Cited in the file of this patent

UNITED STATES PATENTS

| Number | Name | Date |
|---|---|---|
| 1,718,207 | Anibal | June 25, 1929 |
| 1,928,119 | Vorgha | Sept. 26, 1933 |
| 1,976,789 | Lee | Oct. 16, 1934 |
| 2,041,507 | Zeder | May 19, 1936 |
| 2,198,135 | Strasburg et al. | Apr. 23, 1940 |
| 2,454,980 | Sobell | Nov. 30, 1948 |
| 2,514,139 | O'Connor | July 4, 1950 |